No. 800,798. PATENTED OCT. 3, 1905.
C. A. DAHL.
MECHANICAL MOTION.
APPLICATION FILED MAR. 9, 1905.
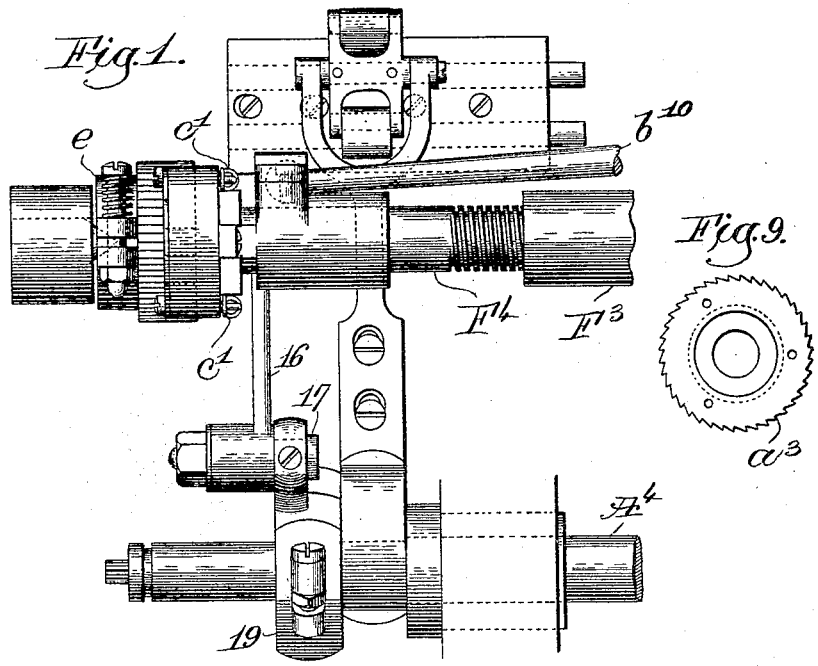
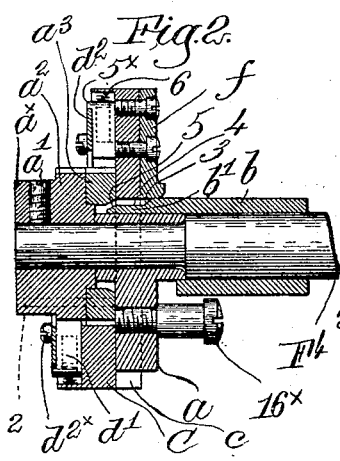
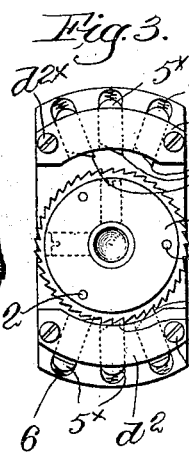
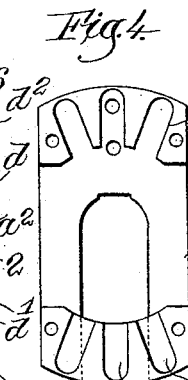
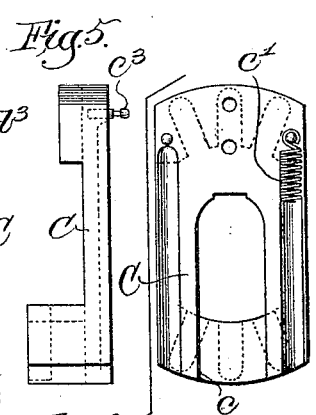
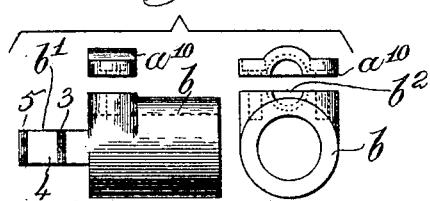
Witnesses.
Thomas J. Drummond.
Fred S. Greenleaf.
Inventor.
Charles A. Dahl,
by Crosby Gregory
Attys.

UNITED STATES PATENT OFFICE.

CHARLES A. DAHL, OF BOSTON, MASSACHUSETTS, ASSIGNOR TO THE REECE BUTTONHOLE MACHINE COMPANY, OF BOSTON, MASSACHUSETTS, A CORPORATION OF MAINE.

MECHANICAL MOTION.

No. 800,798.      Specification of Letters Patent.      Patented Oct. 3, 1905.

Application filed March 9, 1905. Serial No. 249,161.

*To all whom it may concern:*

Be it known that I, CHARLES A. DAHL, a citizen of the United States, residing at Boston, county of Suffolk, State of Massachusetts, have invented an Improvement in Mechanical Motion, of which the following description, in connection with the accompanying drawings, is a specification, like characters on the drawings representing like parts.

This invention has for its object the production of a novel mechanical motion for effecting the rotation of a shaft either forward or backward or for leaving the shaft at rest for any determined period, the duration of rotation of said shaft backward or forward also being variable, the times of starting the movement in one or the other direction being under the control of a shifting device to be described. When the shaft referred to is provided with a screw-thread, it may be made to slide a block in one or the other direction or to leave the block at rest.

The novel mechanical motion comprises a shaft having rigid therewith oppositely-disposed ratchet wheels or members and a pawl-carrier having duplicate sets of pawls, the points of which are oppositely inclined, either set of pawls by a movement of the pawl-carrier through the operation of a shifting device (shown as a slide having bevels or inclines) being made to engage one or the other of said ratchet-wheels, according to the direction it is desired to rotate said shaft.

The mechanism herein to be described may, among other things, be employed to advantage for moving the work carrier or clamp in a buttonhole-stitching machine.

Figure 1 in plan view represents my novel mechanical movement in one of the best forms now known to me. Fig. 2 is a sectional detail through the ratchet wheels or members and pawl-carrier. Fig. 3 is a front elevation of the pawl-carrier with the lower set of pawls in operative engagement with one of the ratchet-wheels. Fig. 4 is a detail showing the pawl-carrier stripped of its pawls. Fig. 5 shows an edge view of the pawl-carrier; Fig. 6, a rear side view, together with the guide-block on which the pawl-carrier is moved at right angles to the longitudinal axis of the shaft when causing one or the other set of pawls to engage one or the other of the ratchet-wheels and springs. Fig. 7 shows the shifting device detached. Fig. 8 is a detail of the friction for retaining the shaft against any but positive rotation. Fig. 9 shows in side elevation the innermost ratchet-wheel $a^3$.

Referring to the drawings, $F^4$ represents a shaft shown as threaded and surrounded by a block $F^3$.

$A^4$ represents a parallel shaft held in a suitable bearing and provided near its end with an eccentric surrounded by an eccentric-strap 19, having a stud 17, that sustains a link 16, that is fitted over a stud-screw $16^\times$, (see Fig. 2,) screwed into a guide-block $a$, which is loosely mounted on the shaft $F^4$.

The parts so far referred to specifically by characters, with the exception of the guide-block $a$, are common to United States Patent No. 749,776, dated January 19, 1904, and in practice the link 16 may be reciprocated as provided for in said patent or by any other usual or suitable means, I having referred to said patent merely as showing one form of means for moving the guide-block. The outer end of shaft $F^4$ has secured to it by a set-screw $a'$ the hub $a^\times$ of a ratchet-wheel $a^2$, said ratchet-wheel having connected therewith by suitable pins 2 a second ratchet-wheel $a^3$, the teeth of said ratchet-wheels being inclined in opposite directions, as represented in the drawings. In this way it will be understood that these ratchet-wheels having oppositely-inclined teeth are fixed to the shaft $F^4$. Surrounding the shaft loosely is a shifting device, shown as a sleeve $b$, having an extended bar $b'$, provided with two bevels or inclines 3 and 5, connected by a horizontal surface 4. The hub $b$ has a projection provided with a recess $b^2$, that receives the ball-shaped end of a link $b^{10}$, which may be the same as the link having a like character and found in said United States patent, said link being held in position by a cap $a^{10}$, the link being connected with any suitable device to move the same intermittingly in one or the other direction, so that either the bevels or inclines 3 or 5 or the horizontal portion 4 may be put in coöperative relation with the pawl-carrier to be described.

The shifting device is supported on the hub of the guide-block $a$, (see Fig. 2,) said guide-block being mounted loosely on the shaft and entering the guideway $c$ at the rear side of the pawl-carrier C, which consequently is mounted loosely with relation to the shaft;

but said pawl-carrier is free to be moved in the direction of its length transversely of the shaft by the bevels or inclines 3 and 5, suitable springs $c'$, connected with pins $c^2$ of said guide-block and with other pins $c^3$ of said carrier, normally acting to cause one set of pawls, as $d$, to engage the innermost ratchet-wheel $a^3$, whereas when said pawl-carrier is moved in the opposite direction, as it may be, as will be described, to overcome the stress of said springs the other set of pawls $d'$ may be made effective to engage the teeth of the outermost ratchet-wheel $a^2$. The pawls have at their outer ends stops $5^\times$ and are acted upon by springs 6, said springs causing the stops of the pawls to contact normally with stop-rests $d^2$, of which there are two, connected to the front side of the pawl-carrier by screws $d^{2\times}$, one for each set of pawls, said rests serving also to retain the pawls in place in the pockets $d^3$ of the pawl-carrier, there being two sets of pockets, one at each end of said pawl-carrier and in the outer face thereof. The hub of the ratchet-wheel $a^2$ is shown as surrounded (see Fig. 1) by a friction device $e$. (Shown detached in Fig. 8.) This device has a notch $e'$ at one end which in practice will embrace any suitable fixed stud or projection to prevent the rotation of the friction device with the shaft, and the friction may be adjusted to suit the requirements of the shaft by turning the screw $e^2$, it being passed through the lugs at the split portion of said friction device and receiving a nut $e^3$, the screw being surrounded by a spring $e^4$ to enable the clamping action to be made more sensitive.

The rear side of the pawl-carrier has connected to it by screws a toe $f$, (shown in Fig. 2,) the inner end of which is acted upon by the cams 3 5 and the straight intermediate portion 4.

In Fig. 2 the bar of the shifting device is shown as projected to its farthest point, and the bevel or incline 3 has acted on the toe and has slid the pawl-carrier transversely of the shaft, putting the pawls $d'$ into engagement with the teeth of the ratchet-wheel $a^2$. Now in this condition as the link 16 is reciprocated the pawls turn said ratchet-wheel in the direction of the arrow thereon, Fig. 3, and with it the shaft, moving said shaft intermittingly and for a distance determined by the number and length of strokes given to the pawl-carrier and the size of the teeth of the ratchet-wheel.

If when the collar $b$ is retracted or drawn to the right, Fig. 2, as it may be at any desired time, the shifting device is arrested with the horizontal part 4 of the bar under the toe. Then the carrier is maintained in such position that neither set of pawls engages either of the ratchet-wheels, the pawls at such time being held in their inoperative positions by the stops thereon contacting with the rests referred to. Now moving the shifting device farther to the right, so that the toe may slide down the bevel or incline 5 and contact with the hub of the guide $a$, then in such position the pawl-carrier is moved by the spring $c'$ sufficiently to enable the set of pawls $d$ to come into operative engagement with the innermost ratchet-wheel $a^3$, and as its teeth are inclined oppositely from the teeth of the ratchet-wheel $a^2$ it follows that the motion of the shaft $F^4$ is reversed, and it may be moved intermittingly for a greater or less period of time, as may be desired and according to the work to be done. As stated, whenever both sets of pawls are disengaged from the ratchet-wheels then the shaft remains at rest and is held at rest by the friction device $e$. It will be understood that the guide-block $a$ is oscillated continuously and that the carrier participates of all the movements of the guide-block.

Where the shaft $F^4$ is threaded as represented and is extended through a block, as $F^3$, it will follow that said block will be moved in one direction or the opposite direction for any desired distance, that depending upon the length of the screw and the time that it is rotated in one or the other direction, or the shaft may be left at rest, and with it the block, for any length of time.

I believe I am the first to revolve a shaft in one or the other direction by or through a constantly-operating pawl-carrier having duplicate sets of pawls either of which may be made to engage one of two ratchet-wheels having oppositely-inclined teeth and rigid with said shaft, said pawl-carrier having also the provision of being held in an intermediate position, so that neither set of said pawls may act to turn the shaft, and consequently the shaft will remain at rest.

Having described my invention, what I claim as new, and desire to secure by Letters Patent, is—

1. In a mechanical movement, a shaft having rigid therewith oppositely-disposed ratchet wheels or members, a pawl-carrier loosely mounted on said shaft and having oppositely-disposed sets of pawls, means to oscillate said pawl-carrier, and means to move said pawl-carrier transversely of said shaft to put one or the other of said sets of pawls in engagement with one or the other of said ratchet-wheels according to the direction it is desired to rotate said shaft.

2. In a mechanical movement, a shaft having rigid therewith connected ratchet-wheels the teeth of which are oppositely inclined, a pawl-carrier loosely mounted on said shaft and having oppositely-disposed sets of pawls, means to oscillate said pawl-carrier, and means to move said pawl-carrier transversely of said shaft to put one or the other of said sets of pawls in engagement with one or the other of said ratchet-wheels or to hold said pawl-carrier in an intermediate position with both sets of pawls in their inoperative relation to said ratchet-wheels.

3. In a mechanical movement, a screw-threaded shaft having rigid therewith oppositely-disposed ratchet wheels or members, a pawl-carrier loosely mounted on said shaft and having oppositely-disposed sets of pawls, means to oscillate said pawl-carrier, and means to move said pawl-carrier transversely of said shaft to put one or the other of said sets of pawls in engagement with one or the other of said ratchet-wheels according to the direction it is desired to rotate said shaft.

4. In a mechanical movement, a shaft having connected ratchet-wheels provided with oppositely-inclined teeth, a guide-block loosely mounted on said shaft, means to oscillate said guide-block, a pawl-carrier slidably mounted on said guide-block and partaking of its movements of oscillation, a plurality of sets of pawls mounted on said pawl-carrier, and a device longitudinally movable with relation to the longitudinal axis of said shaft to move said carrier transversely of said shaft and cause one or the other of said sets of pawls to be operative in rotating said shaft.

5. In a mechanical movement of the class described, a shaft, ratchet-wheels fixed with relation thereto and provided with teeth oppositely inclined, a guide-block mounted loosely on said shaft, means to oscillate said guide-block, a pawl-carrier movably mounted on said guide-block and having a plurality of sets of pawls, a shifting device movable longitudinally of said shaft and having bevels or inclines, and means acting normally to maintain said carrier in contact with said shifting device whatever its position on said shaft.

6. In a mechanical movement of the class described, a shaft, ratchet-wheels fixed thereon and having their teeth oppositely inclined, a pawl-carrier having a plurality of sets of pawls, means to oscillate the pawl-carrier, and means to change the position of the pawl-carrier relatively to the shaft to effect engagement of one or the other of the sets of pawls with one or the other ratchet-wheels, according to the direction the shaft is to be rotated.

In testimony whereof I have signed my name to this specification in the presence of two subscribing witnesses.

CHARLES A. DAHL.

Witnesses:
   GEO. W. GREGORY,
   NORA H. COFFIN.